United States Patent [19]

Schmidt et al.

[11] Patent Number: 5,037,880

[45] Date of Patent: Aug. 6, 1991

[54] HIGHLY DILATANT COPOLYMER DISPERSION HAVING HIGH CONTINUOUS-LOAD STABILITY

[75] Inventors: Franz Schmidt, Mannheim; Richard Bung; Martin Laun, both of Ludwigshafen; Gerd Louis, Carlsberg, all of Fed. Rep. of Germany

[73] Assignee: BASF Aktiengesellschaft, Ludwigshafen, Fed. Rep. of Germany

[21] Appl. No.: 520,807

[22] Filed: May 9, 1990

[30] Foreign Application Priority Data

May 9, 1990 [DE] Fed. Rep. of Germany ....... 3927456

[51] Int. Cl.$^5$ ............... C08L 33/00; C08L 35/00; C08L 31/00
[52] U.S. Cl. .................. 524/823; 524/556; 524/559; 524/564; 524/832
[58] Field of Search ......................... 524/823

[56] References Cited

U.S. PATENT DOCUMENTS

| 4,371,636 | 2/1983 | Distler et al. | 523/223 |
| 4,654,396 | 3/1987 | Bung et al. | 524/401 |

FOREIGN PATENT DOCUMENTS

| 174566 | 11/1987 | European Pat. Off. |
| 1928611 | 11/1974 | Fed. Rep. of Germany |
| 3025562 | 2/1982 | Fed. Rep. of Germany |

Primary Examiner—Joseph L. Schofer
Assistant Examiner—Wu C. Cheng
Attorney, Agent, or Firm—Oblon, Spivak, McClelland, Maier & Neustadt

[57] ABSTRACT

A highly dilatant copolymer dispersion containing, as essential components, an emulsion copolymer prepared from 1 to 10% by weight, based on the sum of the monomers employed, of $\alpha,\beta$-monoolefinically unsaturated carboxylic acids and other olefinically unsaturated monomers, in which the emulsion copolymer is prepared in the presence of from 5 to 30% by weight, based on the sum of the monomers employed, of allyl carboxylate or alkylallyl carboxylate containing 2 or more copolymerizable olefinic double bonds, or a mixture thereof, the alkyl radical containing 1 to 4 C atoms, and the preparation thereof.

11 Claims, No Drawings

HIGHLY DILATANT COPOLYMER DISPERSION HAVING HIGH CONTINUOUS-LOAD STABILITY

The invention relates to a highly dilatant copolymer dispersion which contains, as essential component, an emulsion copolymer prepared from 1 to 10 % by weight, based on the monomers employed, of α,β-monoolefinically unsaturated carboxylic acids and other olefinically unsaturated monomers.

Highly dilatant copolymer dispersions of this type are known per se from EP-B 174,566. These are a class of copolymer dispersions which, under the action of shear forces, undergo a jump in viscosity, i.e. thicken, in a certain manner at a critical shear rate. This specific jump in dilatancy distinguishes the highly dilatant copolymer dispersions from weakly dilatant dispersions, as disclosed, for example, in DE-B 1,928,611 as a raw material for latex paints.

However, the known highly dilatant copolymer dispersions are in need of further improvement. If these dispersions are subjected to repeated or continuous shear stress, the jump in dilatancy becomes smaller, which means that such dispersions cannot be used as a torque transfer medium for the production of hydraulic clutches, vibration dampers or engine speed limiters which are stable under a continuous load.

It is an object of the present invention to provide a highly dilatant copolymer dispersion having high continuous-load stability.

We have found that this object is achieved by a highly dilatant copolymer dispersion containing, as essential component, an emulsion copolymer prepared from 1 to 10 % by weight, based on the monomers employed, of α,β-monoolefinically unsaturated carboxylic acids and other olefinically unsaturated monomers, the emulsion copolymer being prepared in the presence of from 5 to 30 % by weight, based on the monomers employed, of an allyl carboxylate or alkylallyl carboxylate containing 2 or more copolymerizable, olefinic double bonds, or a mixture thereof, the alkyl radical containing 1 to 4 C atoms.

Preferred embodiments and a process for the preparation are given in the subclaims.

Under the action of shear forces, a highly dilatant copolymer dispersion undergoes a jump in viscosity of at least a thousandfold at a certain shear rate $\gamma_k$ (the critical shear rate, which is generally in the range of from 0.1 to $10^4$ sec$^{-1}$). This thickening (jump in dilatancy) is reversible, i.e. the viscosity of the copolymer dispersion drops to low levels again when the shear rate drops below the critical value. In other words, highly dilatant dispersions exhibit an increase in viscosity in a narrow shear rate range, in accordance with the equation $$\frac{d \ln \tau}{d \ln \gamma} \geq 10,$$

where overall the shear stress $\Gamma$ increases with increasing shear rate $\gamma$ by the factor $F > 100$, in particular cases $F > 1000$. The shear stress range of the critical shear rates of dispersions of this type is generally in the range of from $10^3$ to $10^5$ Pa.

Experience shows that the increase in shear stress with time occurs within $10^{-3}$ to $10^{-2}$ seconds if $\gamma_k$ is exceeded only slightly. If the shear rate drops below the same critical shear rate $\gamma_k$, the shear stress usually relaxes automatically in the range of from $10^{-2}$ to $10^{-1}$ seconds after loading.

The copolymer dispersion according to the invention contains, as essential component, an emulsion copolymer.

The latter is prepared from a monomer mixture containing from 1 to 10, preferably 3 to 8, % by weight, based on the monomer mixture employed, of an α,β-monoolefinically unsaturated carboxylic acid, usually a monocarboxylic acid and/or dicarboxylic acid. Suitable carboxylic acids of this type are, in particular, acrylic acid and/or methacrylic acid and maleic acid, itaconic acid and fumaric acid, furthermore monoesters of such dicarboxylic acids with alkanols usually containing 1 to 4 C atoms, for example monomethyl maleate, monoethyl fumarate and n-butyl itaconate. The monocarboxylic acids and dicarboxylic acids (including the monoesters) of the type mentioned generally contain 3 to 9 C atoms. Of particular interest are acrylic acid, methacrylic acid and maleic acid.

Suitable olefinically unsaturated monomers are on the one hand those which produce polymers or copolymers having a glass transition temperature of greater than 50° C., preferably greater than 75° C. Examples are vinyl aromatic polymers, such as styrene, α-methylstyrene, p-methylstyrene, halostyrenes, such as chlorostyrene or methyl methacrylate. These monomers or mixtures thereof are preferably used in amounts of from 40 to 94 % by weight, based on the sum of all the monomers employed. Good results are achieved using 60 to 85 % by weight, based on the sum of all the monomers employed, of vinyl aromatics, such as styrene.

In addition, further monomers which can be copolymerized with the above monomers can also be used, in amounts of up to 40 % by weight, based on the sum of the monomers employed.

Nitrile-containing monomers such as acrylonitrile or methacrylonitrile are also suitable and can be used in amounts of from 0 to 15 % by weight, based on the sum of the monomers employed.

Furthermore, 0 to 20 % by weight, based on the sum of the monomers employed, of monoolefinically unsaturated carboxylates, in particular acrylates of alkanols containing from 1 to 10, preferably 1 to 4 C atoms, methacrylates of alkanols containing from 2 to 10, preferably 2 to 4 C atoms and vinyl esters of straight-chain or branched, aliphatic carboxylic acids usually containing 2 to 12 C atoms. Examples of olefinically unsaturated esters of this type are, in particular, the methanol, ethanol, n-propanol, n-butanol, isobutanol, tert.-butanol and 2-ethylhexyl alcohol esters of acrylic acid and methacrylic acid, such as ethyl acrylate, ethyl methacrylate, n-butyl acrylate, n-butyl methacrylate, isobutyl acrylate, isobutyl methacrylate, tert.-butyl acrylate, tert.-butyl methacrylate and methyl acrylate. Suitable esters are, in particular, vinyl acetate, vinyl propionate and vinyl n-butyrate. Good results are achieved by adding 1 to 6 % by weight, based on the sum of the monomers employed, of ethyl acrylate.

In addition, amides of α,β-unsaturated carboxylic acids are suitable as additional monomers, preferably in amounts of from 1 to 5 % by weight, based on the sum of the monomers employed. Examples are, in particular, methacrylamide, but also acrylamide and derivatives thereof which are substituted on the nitrogen by $C_1$ to $C_{10}$-alkyl or methylol.

Furthermore, up to 3 % by weight, based on the sum of the monomers employed, of polyreactive monomers may be added. The latter can be monomers containing several olefinic double bonds, for example divinyl benzene, butanediol diacrylate or trimethylolpropane triacrylate, or olefinic monomers containing another reactive group, such as glycidyl(meth)acrylate.

Essential to the invention is the use of 5 to 30, preferably 5 to 20, and in particular 10 to 20, % by weight, based on the sum of the monomers employed, of an allyl carboxylate or alkylallyl carboxylate, containing two or more copolymerizable double bonds, or a mixture thereof. The alkyl radical in the alkylallyl carboxylate has 1 to 4 C atoms, and is preferably methyl. Examples which may be mentioned are: alkylallyl esters of polybasic, aromatic or aliphatic carboxylic acids, such as diallyl phthalate, dimethallyl phthalate, diallyl isophthalate, dimethallyl isophthalate, diallyl terephthalate, dimethallyl terephthalate, triallyl trimellitate, trimethallyl trimellitate, diallyl adipate, dimethallyl adipate, diallyl sebacate and dimethylallyl sebacate. Diallyl phthalate is highly suitable. It is also possible to employ allyl esters or methylallyl esters of cyanuric acid. Mention may also be made of alkylallyl esters or allyl esters of $\alpha,\beta$-unsaturated monobasic or polybasic carboxylic acids, such as allyl acrylate, methylallyl acrylate, allyl methacrylate, methallyl methacrylate, monoallyl esters or diallyl esters or monomethallyl esters or dimethallyl esters of maleic acid, fumaric acid or itaconic acid. Diallyl phthalate, triallyl trimellitate, allyl methacrylate and, in particular, allyl acrylate and methallyl methacrylate, and combinations thereof, have proven successful. The composition of the monomers is generally selected such that the glass transition temperature of the emulsion copolymer is greater than 50° C., preferably greater than 75° C.

To prepare the emulsion copolymer, the customary methods of emulsion polymerization in the aqueous phase, such as the batch or feed methods, can be utilized. Preparation is usually carried out at 60 to 95° C. in the presence of up to 0.5 % by weight of anionic emulsifier, up to 1 % by weight, in each case based on the sum of the monomers employed, of nonionic emulsifier, customary amounts of free-radical initiator and with or without regulator. The starting materials can either be introduced at the beginning of the reaction or all or some can be added continuously or in portions during the reaction, individually or as a mixture. The known seed procedure has also proven successful, emulsifier, water, monomer and/or free-radical initiator advantageously being metered in. Here, the monomers are polymerized onto a pre-polymerized latex having a particle size of from 30 to 200 nm, preferably 70 to 150 nm, without significant formation of new particles.

The polymerization process described in DE-B 3,025,562 with simultaneous agglomeration also gives good results, in particular if low critical shear rates are aimed at.

Emulsifiers which may be mentioned are alkyl sulfonates or alkarylsulfonates, which are preferably employed in amounts of from 0.15 to 0.5 % by weight, based on the sum of the monomers employed. Suitable free-radical initiators are customary water-soluble initiators, such as alkali-metal salts or ammonium salts of peroxodisulfuric acid, or alternatively redox systems, such as ascorbic acid/tert.-butyl hydroperoxide.

The emulsion polymerization is generally carried out in a manner such that a dispersion having a solids content of from about 35 to 58, preferably 40 to 55, % by weight results.

The emulsion copolymer obtained generally has a number average particle size of from about 200 to 1000 nm, preferably 250 to 500 nm, in particular 260 to 400 nm.

The copolymer dispersion according to the invention may contain further additives in addition to the emulsion copolymer.

The further additives are preferably 0.1 to 30, in particular 10 to 25, parts by weight, based on 100 parts by weight of the solid of the emulsion copolymer, of oxides, hydroxides, carbonates and/or water-soluble salts of monovalent or divalent metals. Suitable metal compounds are, in particular, magnesium oxide, magnesium hydroxide, calcium oxide, calcium hydroxide, zinc oxide, zinc hydroxide, magnesium sulfate, magnesium acetate, calcium acetate, zinc ammonium carbonate, zinc acetate, calcium carbonate, lithium acetate, and lithium hydroxide, furthermore aluminum hydroxide, strontium oxide, strontium hydroxide, barium oxide, barium hydroxide, and the chlorides and sulfates of lithium, sodium and potassium. Magnesium hydroxide, calcium hydroxide, zinc oxide and zinc ammonium carbonate, in particular lithium oxide, lithium hydroxide and lithium chloride, have proven successful. It is also possible to employ mixtures of these compounds.

Good results are achieved if the highly dilatant copolymer dispersions according to the invention contain an organic peroxide or hydroperoxide whose decomposition temperatures are greater than 130° C., preferably greater than 150° C., for a half life period of 1 hour, measured in 0.2 molar solution in benzene. Such peroxides or hydroperoxides are known per se from the Encyclopedia of Polymer Science and Engineering, Volume 11 (1988), pages 1 to 21. Examples which may be mentioned are dicumyl peroxide, ditertiary-butyl peroxide, pinane hydroperoxide, cumene hydroperoxide and tert.-butyl hydroperoxide. Cumene hydroperoxide and tert.-butyl hydroperoxide have proven particularly successful. They can be added to the emulsion polymer before, during or after the polymerization. It is essential that these substances are present in the highly dilatant copolymer dispersion in an amount of from 0.05 to 1, preferably 0.3 to 0.8, parts by weight, based on 100 parts by weight of the solid of the emulsion polymer.

The highly dilatant copolymer dispersion according to the invention usually contains from 45 to 65, preferably 53 to 63, % by weight of solid polymer. For reasons of simplicity, this solid polymer is equated with the solid of the original dispersion of the emulsion copolymer. The ratio between the solid phase and the liquid phase in the copolymer dispersion according to the invention is generally greater than the corresponding value of the original dispersion of the emulsion copolymer. This ratio may be adjusted in a known manner, for example by removing water by distillation, preferably in vacuo. It is also possible to obtain powders from the emulsion copolymer by spray drying or freeze drying and to redisperse them in water or other liquid media. In some areas of application, it is desirable to use, as the dispersing medium, polyhydric alcohols, such as glycols, diglycols, or triglycols, or formamide, preferably ethylene glycol or glycerol, of mixtures thereof with water. Also suitable for this purpose is the removal of water by distillation and the addition of the desired amounts of polyhydric alcohols. The liquid phase of the copolymer dispersion according to the invention preferably contains more than 30, in particular 30 to 70, % by weight, based on the liquid phase, of water.

If the pH of the copolymer dispersion according to the invention is to be adjusted to a certain value, which is usually between 4 and 10, customary methods may be used, for example addition of ammonia, alkali or alkaline earth metal oxides or hydroxides or the addition of weak acids.

The highly dilatant copolymer dispersion according to the invention is distinguished, in particular, by the fact that it has high continuous-load stability as well as good temperature stability.

This is particularly advantageous if such copolymer dispersions according to the invention are used as torque transfer medium in vibration dampers, engine speed limiters or hydraulic clutches, since constant, long-term use is then possible.

EXAMPLES

The parts and percentages given in the examples relate to the weight. All polymerizations are carried out in stirred vessels equipped with heating or cooling devices, stirrers and feed vessels. General procedure:

The initial components (see Table 1), 7 parts of feed 1 indicated in Table 1 and 1 part of feed 2 indicated in Table 1 are introduced into the polymerization vessel and mixed.

The batch is heated to 80° C. with stirring, at which the polymerization commences. After 30 minutes at 80° C., the remainders of feeds 1 and 2 are then added at a constant rate over the course of 3 hours, and the batch is subsequently stirred at 80° C. for a further 2 hours, and finally cooled and discharged.

The solids content, the particle size and the pH of the resultant dispersions are also indicated in Table 1.

TABLE 1

| | Examples | | | | | | | | | | |
|---|---|---|---|---|---|---|---|---|---|---|---|
| | 1 | 2 | 3 | 4 | 5 | 6 | 7 | 8 | 9 | CA | CB |
| | | | | | [parts] | | | | | | |
| Initial components: | | | | | | | | | | | |
| water | 17 | 17 | 17 | 17 | 17 | 17 | 17 | 17 | 17 | 17 | 17 |
| 50% strength seed latex comprising 70% of styrene and 30% of butadiene and having a particle diameter of 120 nm | 1.6 | | | 1.6 | 1.6 | 1.6 | 1.6 | 1.6 | 1.6 | 1.6 | |
| Diallyl phthalate | 4 | | 2 | | | 4 | 4 | | | | |
| Cumene hydroperoxide (80% strength) | 0.3 | 0.3 | 0.24 | 0.12 | 0.3 | 0.3 | 0.3 | 0.3 | 0.3 | | |
| Disodium dodecyldiphenyl ether disulfonate (45% strength) | 0.09 | | | | 0.09 | 0.09 | 0.09 | 0.09 | 0.09 | | |
| Feed 1 | | | | | | | | | | | |
| Water | 25.5 | 25.5 | 25.5 | 25.5 | 25.5 | 25.5 | 25.5 | 25.5 | 25.5 | 25.5 | 25.5 |
| Emulsifier (as in initial components) | 0.27 | 0.27 | 0.27 | 0.27 | 0.27 | 0.27 | 0.27 | 0.27 | 0.27 | 0.27 | 0.8[1] |
| Styrene | 30.4 | 29.2 | 29.2 | 26.8 | 28 | 28 | 28 | 28 | 31.2 | 36.4 | 32 |
| Ethyl acrylate | 0.8 | | 2 | 2.4 | 1.2 | 1.2 | 1.2 | 1.2 | | 0.8 | 4.8 |
| Diallyl phthalate | 2 | | | | | | | | | | |
| Triallyl trimellitate | | 8 | 4 | | | | | 4 | | | |
| Methallyl methacrylate | | | | 8 | | | | 4 | 4 | | |
| Allyl acrylate | | | | | 8 | | 4 | | 4 | | |
| Allyl methacrylate | | | | | | 4 | | | | | |
| Acrylic acid | 2 | 2 | 2 | 2 | 2 | 2 | 2 | 2 | 2 | 2 | 1.2 |
| Methacrylamide | 0.8 | 0.8 | 0.8 | 0.8 | 0.8 | 0.8 | 0.8 | 0.8 | 0.8 | 0.8 | 1.2 |
| Maleic acid | | | | | | | | | | | 0.8 |
| Butanediol diacrylate | | | | | | | | | | | 0.4[2] |
| Feed 2 | | | | | | | | | | | |
| Water | 7 | 7 | 7 | 7 | 7 | 7 | 7 | 7 | 7 | 7 | 7 |
| Sodium peroxodisulfate | 0.28 | 0.28 | 0.28 | 0.28 | 0.28 | 0.28 | 0.28 | 0.28 | 0.28 | 0.28 | 0.28 |
| Solids content [%] (DIN 53 189, 1972, Part C) | 43.2 | 43.1 | 40.2 | 42.4 | 43.1 | 42.7 | 42.3 | 43.0 | 44.2 | 43.9 | 40.5 |
| Particle size [nm] | 302 | 338 | 353 | 351 | 321 | 306 | 297 | 320 | 292 | 355 | 420 |
| pH | 3.7 | 3.5 | 3.2 | 3.2 | 4.2 | 4.4 | 4.1 | | 4.4 | 4.2 | |

[1] Sodium lauryl sulfate (15% strength)
[2] Added to feed 1 after a feed time of 1.5 hours After the polymerization, powders are prepared from the resultant dispersions by freeze drying. For rheological testing, in each case 100 parts of freezedried powder (residual water content 2 to 3 %) are redispersed in 62 parts of an aqueous dispersant containing 12.35 parts of lithium chloride and 0.87 parts of lithium hydroxide.

All samples are first subjected to a shear stress of $0.5 \times 10^5$ Pa for 5 minutes in a stress viscosimeter. The critical shear rate and the maximum shear stress are then measured. Subsequently, the sample is prestressed at relatively long shear times and relatively high shear stresses, after which the critical shear rate and the maximum shear stress are again measured.

As shown by the test results collated in Table 2, the dispersions according to the invention are distinguished by very high continuous-load stability; the maximum shear stress achieved in the jump in dilatancy is substantially independent of the prestress.

TABLE 2

| | Prestress | | Dilatancy after prestress | |
|---|---|---|---|---|
| | | | Critical shear rate | Maximum shear stress |
| Example | Shear stress $10^5$Pa | Duration minutes | $s^{-1}$ | $10^5$Pa |
| Comparison Example A | 0.5 | 5 | 20 | 1.2 |
| | 0.8 | 70 | 10 | 0.3 |
| Comparison Example B | 0.5 | 5 | 20 | 0.6 |
| | 0.7 | 16 | not measurable | <0.1 |
| Example 1 | 0.5 | 5 | 50 | 1.8 |
| | 1.6 | 120 | 50 | 1.8 |

TABLE 2-continued

| Example | Prestress Shear stress $10^5$Pa | Prestress Duration minutes | Dilatancy after prestress Critical shear rate $s^{-1}$ | Dilatancy after prestress Maximum shear stress $10^5$Pa |
|---|---|---|---|---|
| Example 2 | 0.5 | 5 | 30 | 1.3 |
|  | 1.0 | 20 | 20 | 1.4 |
|  | 1.0 | 3840 | 20 | 1.4 |
| Example 3 | 0.5 | 5 | 15 | 1.2 |
|  | 1.0 | 20 | 15 | 1.2 |
| Example 4 | 0.5 | 5 | 25 | 1.0 |
|  | 1.0 | 20 | 25 | 1.0 |
|  | 1.0 | 90 | 25 | 1.0 |
| Example 5 | 0.5 | 5 | 75 | 1.0 |
|  | 0.9 | 36 | 85 | 1.0 |
| Example 6 | 0.5 | 5 | 25 | 1.4 |
|  | 1.2 | 20 | 30 | 1.4 |
|  | 1.4 | 20 | 30 | 1.4 |
| Example 7 | 0.5 | 5 | 60 | 1.2 |
|  | 1.2 | 20 | 70 | 1.2 |
|  | 1.4 | 20 | 70 | 1.2 |
| Example 8 | 0.5 | 5 | 10 | 1.9 |
|  | 1.2 | 60 | 10 | 1.9 |
| Example 9 | 0.5 | 5 | 75 | 0.6 |
|  | 0.8 | 20 | 50 | 0.7 |

We claim:

1. A highly dilatant copolymer dispersion containing, as essential component, an emulsion copolymer prepared from 1 to 10 % by weight, based on the sum of the monomers employed, of $\alpha,\beta$-monoolefinically unsaturated carboxylic acids and other olefinically unsaturated monomers, wherein the emulsion copolymer is prepared in the presence of from 5 to 30 % by weight, based on the sum of the monomers employed, of an allyl carboxylate or alkylallyl carboxylate containing 2 or more copolymerizable olefinic double bonds, or a mixture thereof, the alkyl radical containing 1 to 4 C atoms.

2. A highly dilatant copolymer dispersion as claimed in claim 1, whose emulsion copolymer has been prepared from 1 to 10 % by weight of $\alpha,\beta$-monoolefinically unsaturated carboxylic acids, 40 to 94 % by weight of vinyl aromatic monomers, methyl methacrylate or a mixture thereof, 6 to 30 % by weight of an allyl carboxylate or alkylallyl carboxylate, containing 2 or more copolymerizable olefinic double bonds, or a mixture thereof, the alkyl radical containing 1 to 4 C atoms and 0 to 40 % by weight of further copolymerizable monomers, the % by weight data being based on the sum of the monomers employed.

3. A highly dilatant copolymer dispersion as claimed in claim 1, in which the allyl carboxylate or alkylallyl carboxylate is selected from the group consisting of allyl acrylate, alkylallyl acrylate, allylalkyl acrylate and alkylallyl alkylacrylate, or a mixture thereof, the alkyl groups, independently of one another, having up to 4 C atoms.

4. A highly dilatant copolymer dispersion as claimed in claim 1, containing from 0.05 to 1 part by weight, based on 100 parts by weight of the solid of the emulsion copolymer, of organic peroxides whose decomposition temperatures are greater than 130° C. for a half life period of 1 hour.

5. A highly dilatant copolymer dispersion as claimed in claim 1, containing from 0.05 to 1 part by weight, based on 100 parts by weight of the solid of the emulsion copolymer, of organic hydroperoxides whose decomposition temperatures are greater than 130° C. for a half life period of 1 hour.

6. A highly dilatant copolymer dispersion as claimed in claim 1, containing from 0.1 to 30 parts by weight, based on 100 parts by weight of the solid of the emulsion copolymer, of oxides, hydroxides, carbonates or watersoluble salts of monovalent or divalent metals, or mixtures thereof.

7. A process for the preparation of a highly dilatant copolymer dispersion as claimed in claim 1, which comprises preparing the emulsion copolymer in aqueous emulsion from 0.1 to 10 % by weight, based on the sum of the monomers employed, of $\alpha,\beta$-monoolefinically unsaturated carboxylic acids, 6 to 30 % by weight, based on the sum of the monomers employed, of an allyl carboxylate or alkylallyl carboxylate containing 2 or more copolymerizable olefinic double bonds, or a mixture thereof, the alkyl radical containing 1 to 4 C atoms, and other olefinically unsaturated monomers.

8. A highly dilatant copolymer dispersion as claimed in claim 1, in which said emulsion copolymer is prepared in the presence of from 6 to 20% by weight, based on the sum of the monomers employed, of said allyl carboxylate or said alkyl- allyl carboxylate.

9. A highly dilatant copolymer dispersion as claimed in claim 1, in which said emulsion copolymer is prepared in the presence of from 10 to 20% by weight, based on the sum of the monomers employed, of said allyl carboxylate or said alkyl-allyl carboxylate.

10. A process as claimed in claim 7, wherein said allyl carboxylate or said alkylallyl carboxylate is employed in an amount of 6 to 20% by weight, based on the sum of the monomers employed.

11. A process as claimed in claim 7, wherein said allyl carboxylate or said alkylallyl carboxylate is employed in an amount of 10 to 20% by weight, based on the sum of the monomers employed.

* * * * *

UNITED STATES PATENT AND TRADEMARK OFFICE
CERTIFICATE OF CORRECTION

PATENT NO. : 5,037,880

DATED : August 6, 1991

INVENTOR(S) : Franz Schmidt et al.

It is certified that error appears in the above-identified patent and that said Letters Patent is hereby corrected as shown below: On the Title page The Foreign Application Priority Data is Incorrect, should be, --May 9, 1990 [DE] Fed. Rep. of Germany .........3917456--.

Signed and Sealed this

Twenty-ninth Day of December, 1992

*Attest:*

DOUGLAS B. COMER

*Attesting Officer*      *Acting Commissioner of Patents and Trademarks*